United States Patent
Or et al.

(10) Patent No.: US 11,667,099 B2
(45) Date of Patent: Jun. 6, 2023

(54) SYSTEM FOR CREATING A RELIEF PATTERN ON A SUBSTRATE

(71) Applicant: HIGHCON SYSTEMS LTD., Yavne (IL)

(72) Inventors: Ron Or, Tel Aviv (IL); Michael Karp, Petah-Tikva (IL); Claudio Rottman, Modiin (IL)

(73) Assignee: HIGHCON SYSTEMS LTD., Yavne (IL)

( * ) Notice: Subject to any disclaimer, the term of this patent is extended or adjusted under 35 U.S.C. 154(b) by 634 days.

(21) Appl. No.: 16/304,288

(22) PCT Filed: May 25, 2017

(86) PCT No.: PCT/IB2017/053089
§ 371 (c)(1),
(2) Date: Nov. 25, 2018

(87) PCT Pub. No.: WO2017/208118
PCT Pub. Date: Dec. 7, 2017

(65) Prior Publication Data
US 2019/0084265 A1     Mar. 21, 2019

(30) Foreign Application Priority Data

May 29, 2016 (GB) .................................. 1609458

(51) Int. Cl.
*B31F 1/07* (2006.01)
*B31F 1/10* (2006.01)
(Continued)

(52) U.S. Cl.
CPC ................ *B31F 1/07* (2013.01); *B29C 59/02* (2013.01); *B29C 59/046* (2013.01); *B31F 1/08* (2013.01);
(Continued)

(58) Field of Classification Search
CPC ...... B31F 1/07; B31F 1/10; B31F 1/08; B31F 2201/0702; B31F 2201/0733;
(Continued)

(56) References Cited

U.S. PATENT DOCUMENTS 262,369 A    8/1882   Cameron
1,480,025 A  1/1924   Speer
(Continued)

FOREIGN PATENT DOCUMENTS

CN    102257441 A    11/2011
CN    102947090 A    2/2013
(Continued)

OTHER PUBLICATIONS

Packaging Technology Economics Series, "Introduction to Packaging and Packaging Materials", Liu Hanguang Liu Menghua Editor-in-Chief, Hao Qinglin Material Publishing House, Beijing, Aug. 1, 1982, pp. 249 and 252.

*Primary Examiner* — Christopher E Mahoney
*Assistant Examiner* — Marissa Ferguson-Samreth
(74) *Attorney, Agent, or Firm* — Daniel Feigelson

(57) ABSTRACT

A die and counter die system for impressing a relief pattern onto a substrate, including a male die film and at least one female die. The female die includes a female-die contact surface including at least one cavity defining the relief pattern. The male die film includes a flexible male-die contact surface which is featureless in a region thereof opposing the relief pattern on the at least one female die. The system further includes a compression mechanism adapted, when the substrate is disposed between the male die contact surface and the female die contact surface, to move the male die film and the at least one female die towards one another so as to impress the relief pattern on the substrate.

20 Claims, 8 Drawing Sheets

(51) Int. Cl.
  *B29C 59/02* (2006.01)
  *B31F 1/08* (2006.01)
  *B29C 59/04* (2006.01)
  *B44B 5/00* (2006.01)
  *B44B 5/02* (2006.01)
(52) U.S. Cl.
  CPC .............. *B31F 1/10* (2013.01); *B44B 5/0047* (2013.01); *B44B 5/026* (2013.01); *B31F 2201/0702* (2013.01); *B31F 2201/0733* (2013.01); *B31F 2201/0738* (2013.01)
(58) Field of Classification Search
  CPC ............. B31F 2201/0738; B44B 5/026; B44B 5/0047; B29C 59/046
  See application file for complete search history.

(56) References Cited

U.S. PATENT DOCUMENTS

| | | |
|---|---|---|
| 4,044,500 A | 8/1977 | Hitzman |
| 6,059,914 A | 5/2000 | Suss |
| 2005/0155403 A1 | 7/2005 | Tidemann et al. |
| 2006/0040816 A1 | 2/2006 | Gordon |
| 2008/0202362 A1 | 8/2008 | Stravitz |
| 2011/0217092 A1 | 9/2011 | Sekihara et al. |
| 2011/0194913 A1 | 12/2011 | Zimmer et al. |
| 2011/0296726 A1 | 12/2011 | Rinko |
| 2012/0121802 A1 | 5/2012 | Dahan et al. |
| 2015/0234940 A1 | 8/2015 | Boegli et al. |
| 2017/0113432 A1 | 4/2017 | Rottman |
| 2017/0313018 A1* | 11/2017 | Pessotto .................... B31F 1/07 |

FOREIGN PATENT DOCUMENTS

| | | | |
|---|---|---|---|
| CN | 102985612 A | 3/2013 | |
| DE | 1577909 * | 6/1970 | ........... B44B 5/0047 |
| DE | 1577909 A | 6/1970 | |
| DE | 4240527 A1 | 6/1994 | |
| WO | 2015/155685 A1 | 10/2015 | |
| WO | 2016/074798 A1 | 5/2016 | |

* cited by examiner

SYSTEM FOR CREATING A RELIEF PATTERN ON A SUBSTRATE

FIELD OF THE INVENTION

The present invention relates to die and counter die systems and, more particularly, to a die and counter die systems including a male die film and a female counter die.

SUMMARY OF THE INVENTION

According to one aspect of the present invention there is provided a system for impressing a relief pattern on a substrate, the system including:

at least one female die including a female-die contact surface, the female-die contact surface including at least one cavity defining the relief pattern; and a male die film including a flexible male-die contact surface spaced from the female-die contact surface, the male-die contact surface being featureless in a region thereof opposing the relief pattern on the at least one female die; and a compression mechanism adapted to move the male die film and the at least one female die towards one another in an operative mode, wherein, in the operative mode, when the substrate is disposed between the male-die contact surface and the female-die contact surface, the compression mechanism moves the male die film and the at least one female die towards one another such that the female-die contact surface engages a first broad surface of the substrate and the male-die contact surface engages an opposing broad surface of the substrate so as to impress the relief pattern on the substrate.

In some embodiments, in the operative mode, the substrate is urged into the at least one cavity thereby to form the relief pattern on the substrate.

In some embodiments, at least part of the relief pattern is defined on a bottom surface of the cavity, and the substrate is urged into the cavity to engage the relief pattern on the bottom surface so as to impress the relief pattern on the substrate.

In some embodiments, the male die film includes a resilient male die film. In some embodiments, the resilient male die film includes at least one of polyurethane, polybutadiene rubber, and polyisoprene rubber. In some embodiments, the resilient male die film has a thickness in the range of 0.5 mm to 5 mm, 0.5 mm to 4 mm, 0.5 mm to 3 mm, 0.5 mm to 2 mm, or 0.5mm to 1 mm.

In some embodiments, the flexible male die film includes a compressible male die film. In some embodiments, the compressible male die film includes multiple layers.

In some embodiments, the compressible male die film includes:

a base layer;

a contact layer including the male-die contact surface adapted to contact the substrate; and a compressible layer disposed between the base layer and the contact layer and attached thereto.

In some embodiments, the compressible male die film has compressibility, in a direction perpendicular to a broad face of the compressible male die film, in the range of 5-30%, 6-30%, 9-25%, 9-20%, or 9-15% at 1.35 MPa.

In some embodiments, the base layer has a thickness in the range of 0.15 mm to 1 mm.

In some embodiments, the base layer includes a metal layer. In some embodiments, the metal layer includes at least one of steel and aluminum.

In some embodiments, the base layer includes a polymer layer. In some embodiments, the polymer layer includes PET.

In some embodiments, the base layer includes a fabric layer. In some embodiments, the fabric layer includes a material selected from the group consisting of polyester, rayon, and cotton. In some embodiments, the fabric layer includes a woven fabric. In some embodiments, the woven fabric has a density in the range of 10 to 30 threads per cm.

In some embodiments, the fabric layer includes at least two layers of fabric attached to one another. In some embodiments, the at least two layers of fabric are laminated to one another.

In some embodiments, the fabric layer is impregnated with a rubber-based material. In some embodiments, the rubber-based material includes a material selected from the group consisting of acrylonitrile butadiene copolymer rubber, EPDM rubber, and chloroprene rubber. In some embodiments, the rubber-based material includes at least one of a vulcanizing agent, a vulcanization accelerator, an auxiliary vulcanization accelerator, a filler, a reinforcer, a softener, a plasticizer, and an antioxidant.

In some embodiments, the compressible layer is adapted to decrease lateral deformation resulting from pressure applied to the male die film in a direction perpendicular to the broad face thereof In some embodiments, the compressible layer is adapted to enable the relief pattern impressed on the substrate to be sharper. In some embodiments, the compressible layer has a thickness in the range of 0.1 5mm to 5 mm, 0.15 mm to 4 mm, 0.15 mm to 3 mm, 0.15 mm to 2 mm, or 0.15 mm to 1 mm.

In some embodiments, the compressible layer includes a rubber foam layer. In some embodiments, the rubber foam layer includes a synthetic rubber. In some embodiments, the synthetic rubber includes at least one material selected from the group consisting of acrylonitrile-butadiene copolymer rubber, butadiene rubber, poly-isoprene rubber, butyl rubber, chloroprene rubber, EPDM rubber, and polyurethane rubber.

In some embodiments, the compressible layer is directly attached to the base layer. In some embodiments, the compressible layer is attached to the base layer by at least one of an adhesive and lamination.

In some embodiments, the contact layer includes a rubber-based material. In some embodiments, the rubber based material includes at least one synthetic rubber. In some embodiments, the synthetic rubber includes at least one material selected from the group consisting of acrylonitrile-butadiene rubber (NBR), hydrogenated NBR, butadiene rubber, poly-isoprene rubber, butyl rubber chloroprene rubber (CR), polyurethane rubber, polysulfide rubber, and acrylic rubber. In some embodiments, the rubber-based material further includes at least one of a vulcanizing agent, a vulcanization accelerator, an auxiliary vulcanization accelerator, a filler, a reinforcer, a softener, a plasticizer, and an antioxidant. In some embodiments, the rubber based material includes a compressible rubber based material. In some such embodiments, the reinforcer is a component of the rubber-based material or formulation, which increases mechanical properties or strength of the rubber based material, such as, for example, carbon black or glass fibers.

In some embodiments, the contact layer has a thickness in the range of 0.1 mm to 5 mm, 0.1 mm to 4 mm, 0.1 mm to 3 mm, 0.1 mm to 2 mm, or 0.1 mm to 1 mm.

In some embodiments, the compressible male die film further includes:

a reinforcing fabric layer adapted to provide structural reinforcement to the compressible male die film; and a rubber layer attached along a broad face thereof to the reinforcing fabric layer.

In some embodiments, the reinforcing fabric layer includes a woven fabric. In some embodiments, the reinforcing fabric layer includes a material selected from the group consisting of polyester, rayon, and cotton. In some embodiments, the reinforcing fabric layer is impregnated with a rubber-based material. In some embodiments, the reinforcing layer has a thickness in the range of 0.15 mm to 1 mm.

In some embodiments, the rubber layer has a thickness in the range of 0.15 mm to 5 mm, 0.15 mm to 4 mm, 0.15 m to 3 mm, 0.15 mm to 2 mm, or 0.15 mm to 1 mm.

In some embodiments, a first broad face of the rubber layer is attached to a first broad face of the reinforcing layer, a second broad face of the rubber layer is disposed adjacent the base layer, and the second broad face of the reinforcing layer is disposed adjacent the compressible layer.

In some embodiments, the compressible male die film has a thickness in the range of 0.7 5mm to 10 mm, 1 mm to 9 mm, 2 mm to 8 mm, or 3 mm to 7 mm. In some embodiments, the contact layer of the compressible male die film having a Shore A hardness in the range of 10 to 80 or 20 to 70.

In some embodiments, the compressible male die film further includes a surface modulating layer disposed between the base layer and the contact layer and adapted such that, in the operative mode when pressure applied to the contact layer exceeds an amount of pressure required to fully compress the compressible layer, the surface modulating layer responds by modulating at least one of a height and a surface area of a deformation formed on the contact layer.

In some embodiments, the surface modulating layer is attached along a first broad face thereof to the compressible layer and along a second broad face thereof to the contact layer.

In some embodiments, the surface modulating layer is adapted to inhibit the contact layer from separating from the compressible layer or from being rotationally shifted relative thereto during impression of the relief pattern on the substrate. In some embodiments, the surface modulating layer is adapted to increase an amount of pressure that can be applied to the contact surface at a time of impression without damaging the substrate or the relief pattern impressed thereon.

In some embodiments, the surface modulating layer has a thickness in the range of 0.15 mm to 1 mm.

In some embodiments, the surface modulating layer including a fabric layer impregnated with a rubber-based material. In some embodiments, the fabric layer includes a material selected from the group consisting of polyester, rayon, and cotton.

In some embodiments, the fabric layer includes a woven fabric. In some embodiments, the woven fabric has a density in the range of 10 to 30 threads per cm.

In some embodiments, the fabric layer includes at least two layers of fabric attached to one another. In some embodiments, the at least two layers of fabric are laminated to one another.

In some embodiments, the rubber-based material is selected from the group consisting of acrylonitrile butadiene copolymer rubber, EPDM rubber, and chloroprene rubber. In some embodiments, the rubber-based material includes at least one of a vulcanizing agent, a vulcanizing accelerator, and a softening agent.

In some embodiments, the contact layer of the compressible male die film having a Shore A hardness in the range of 60-90 or 65-75.

In some embodiments, the compressible male die film having a thickness in the range of 0.5 mm to 10 mm, 1 mm to 8 mm, 1 mm to 6 mm, 1 mm to 5 mm, 1 mm to 3 mm, or 1 mm to 2 mm.

In some embodiments, the compression mechanism is adapted to apply sufficient pressure to the compressible male die film in a direction perpendicular to a broad face thereof, such that the compressible layer absorbs the pressure by compressing until the compressible layer is substantially incompressible.

In some embodiments, following impression of the relief pattern on the substrate, the relief pattern is sharper on the first surface of the substrate than on the opposing surface of the substrate.

In some embodiments, the female die includes a rule die adapted to impress onto the substrate a crease line as the relief pattern. In some embodiments, the rule die includes a channel formed in the female die.

In some embodiments, the female die includes an embossing pattern adapted to emboss the substrate with the embossing pattern as the relief pattern. In some embodiments, the female die includes at least one cavity disposed below a nominal surface line of the female die, the at least one cavity defining at least part of the relief pattern.

In some embodiments, the relief pattern is defined by at least one wall surrounding a surface at or above a nominal surface line of the female die, the wall having a wall height, and a side of the at least one wall, distal to the relief pattern, defines a gradient from the wall height to the nominal surface line of the female die. In some embodiments, the gradient has a length to height ratio of at least 10, at least 15, or at least 20. In some embodiments, a profile of the gradient is linear. In some embodiments, a profile of the gradient is truncated. In some embodiments, a profile of the gradient has a complex geometric form including at least one of a Gaussian element, a sinusoid element, and a parabolic element.

In some embodiments, a height of the die is less than 5 mm, less than 4 mm, less than 3 mm, less than 2 mm, or less than 1 mm.

In some embodiments, at least one of the at least one female die and the male die film is mounted onto a rotating drum. In some embodiments, the at least one female die is mounted onto a first rotating drum and the male die film is mounted onto a second rotating drum.

In some embodiments, the substrate includes a fibrous substrate. In some embodiments, the fibrous substrate includes a corrugated substrate. In some embodiments, the fibrous substrate includes paper. In some embodiments, the paper includes a paper coated by a metal foil. In some embodiments, the paper includes a paper coated by a plastic coating. In some embodiments, the paper has a thickness in the range of 0.1-5 mm.

In some embodiments, the substrate includes a metal foil. In some embodiments, the metal foil is selected from the group consisting of a copper foil and an aluminum foil. In some embodiments, the metal foil includes a shape memory metal alloy foil. In some embodiments, the metal foil has a thickness in the range of 0.02 mm to 0.2 mm.

In some embodiments, the substrate includes a plastic substrate. In some embodiments, the plastic substrate has a thickness in the range of 0.05-0.5 mm. In some embodiments, the system further includes a heating mechanism for applying heat to the plastic substrate during impression of the relief pattern thereon.

According to yet another aspect of the present invention there is provided a system for producing a featured male die contact surface, the system including:

at least one female die including a female-die contact surface, the female-die contact surface including at least one cavity defining the relief pattern; and a male die film including a contact layer of the male die film which includes a thin sheet of a non-resilient material, the contact layer spaced from the female-die contact surface, the male-die contact layer being featureless in a region thereof opposing the relief pattern on the at least one female die; and a compression mechanism adapted to move the male die film and the at least one female die towards one another in an operative mode, wherein, in the operative mode, the compression mechanism moves the male die film and the at least one female die towards one another so as to impress the relief pattern on the contact layer of the male die film.

According to another aspect of the present invention there is provided a method of producing a featured male-die contact surface, the method including:

providing a system as described hereinabove, wherein the contact layer of the male die film includes a thin featureless sheet of a non-resilient material;

employing the compression mechanism to move the male die film and the female die toward one another thereby to apply pressure the contact layer of the male die film and to impress the relief pattern on the substrate, wherein the pressure applied to the contact layer of the male die film causes the contact layer to be urged into the at least one cavity, thereby to form a male die including at least one feature on the contact layer, such that at least part of the at least one feature is sustained after disengagement between the male die film and the at least one cavity.

In some embodiments, a feature of the featured male die corresponds to the at least one cavity of the female die.

According to yet another aspect of the present invention there is provided a method for embossing a substrate using a system including at least one female die, the method including:

generating at least one male die corresponding in shape to the at least one female die using the method described hereinabove;

placing a substrate between the at least one female die and the generated at least one male die; and moving the at least one male die toward the at least one female die such that the at least one male die engages a first broad surface of the substrate and the at least one female die engages an opposing broad surface of the substrate so as to impress a relief pattern corresponding to the shape of the at least one female die on the substrate.

According to a further aspect of the present invention there is provided a method for impressing a relief pattern on a substrate, the method including:

placing a substrate between at least one female die and a male die film, wherein the at least one female die includes a female-die contact surface including at least one cavity defining the relief pattern, and wherein the male die film includes a flexible male-die contact surface spaced from the female-die contact surface, the male-die contact surface being featureless in a region thereof opposing the relief pattern on the at least one female die; and moving the at least one female die and the male die film towards one another such that the female-die contact surface engages a first broad surface of the substrate and the male-die contact surface of the male die film engages an opposing broad surface of the substrate so as to impress the relief pattern on the substrate.

In some embodiments, the male die film includes a compressible male die film, including:

a base layer;

a contact layer including the male-die contact surface adapted to contact the substrate; and a compressible layer disposed between the base layer and the contact layer and attached thereto;

and wherein the moving includes moving the at least one female die and the compressible male die film toward one another, thereby to apply sufficient pressure to the compressible male die film in a direction perpendicular to a broad face thereof, such that the compressible layer absorbs the pressure by compressing until the compressible layer is substantially incompressible.

In some embodiments, the substrate includes a fibrous substrate. In some embodiments, the fibrous substrate includes a corrugated substrate. In some embodiments, the fibrous substrate includes paper. In some embodiments, the paper includes a paper coated by a metal foil. In some embodiments, the paper includes a paper coated by a plastic coating. In some embodiments, the paper has a thickness in the range of 0.1-5 mm.

In some embodiments, the substrate includes a metal foil. In some embodiments, the metal foil is selected from the group consisting of a copper foil and an aluminum foil. In some embodiments, the metal foil includes a shape memory metal alloy foil. In some embodiments, the metal foil has a thickness in the range of 0.02 mm to 0.2 mm.

In some embodiments, the substrate includes a plastic substrate. In some embodiments, the plastic substrate has a thickness in the range of 0.05-0.5 mm. In some embodiments, the method further includes applying heat to the plastic substrate during impression of the relief pattern thereon.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

The present invention relates to die and counter die systems and, more particularly, to a die and counter die systems including a male die film and a female counter die.

Figure 1A:
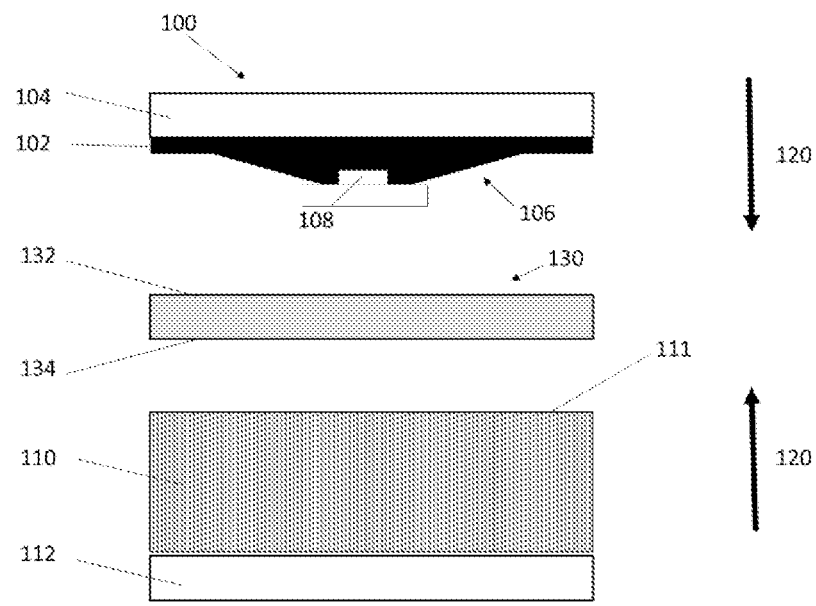
FIGS. 1A and 1B are schematic cross-sectional diagram of two embodiments of an inventive male die film and female die system for impressing a relief pattern on a substrate in accordance with aspects of the present invention.
Figure 1B:
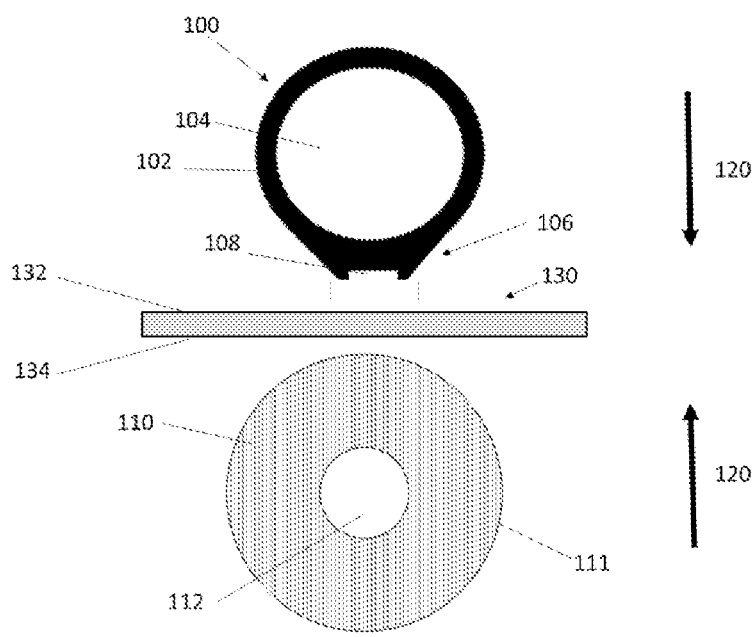
Figure 2A:
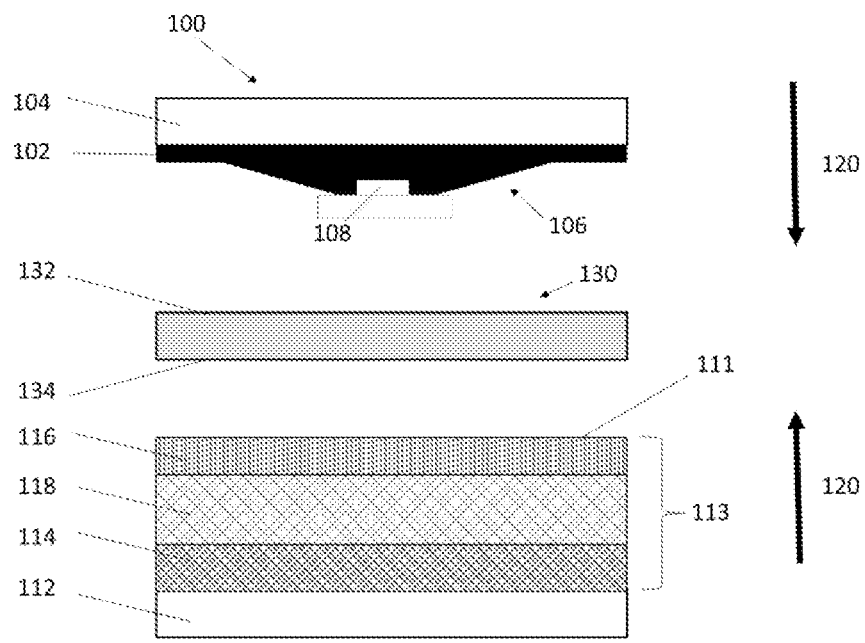
FIGS. 2A and 2B are schematic cross-sectional diagram of two embodiments of an inventive compressible male die film and female die system for impressing a relief pattern on a substrate in accordance with aspects of the present invention.
Figure 2B:
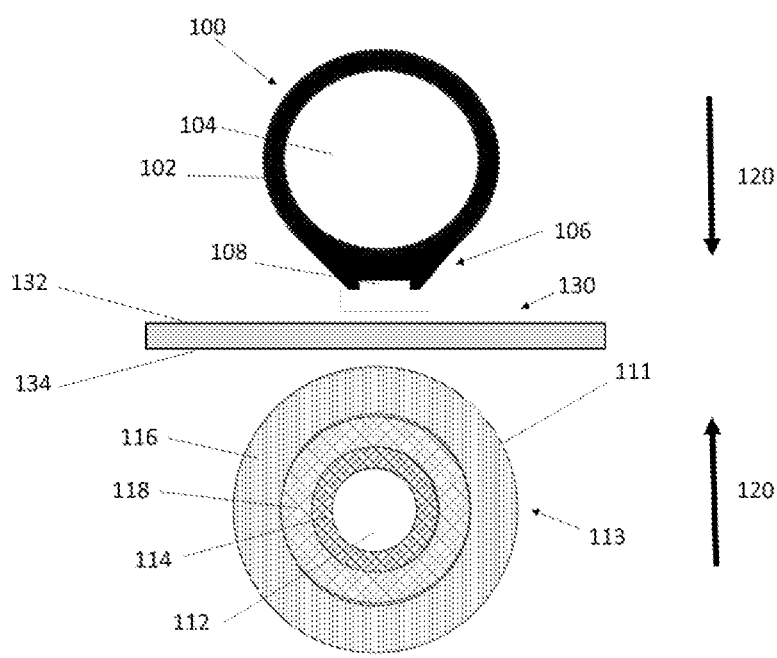

Reference is now made to FIGS. 1A and 1B, which are schematic cross-sectional diagram of two embodiments of an inventive male die film and female die system for impressing a relief pattern on a substrate in accordance with aspects of the present invention, and to FIGS. 2A and 2B, which are schematic cross-sectional diagram of two embodiments of an inventive compressible male die film and female die system for impressing a relief pattern on a substrate in accordance with aspects of the present invention.

As seen in FIGS. 1A to 2B, a system 100 for impressing a relief pattern on a substrate includes a female die 102 mounted onto a base 104, the female die having a female-die contact surface 106 including at least one cavity 108 defining the relief pattern, to be impressed onto a substrate as described hereinbelow. The base 104 may be a flat, or planar base, as illustrated in FIGS. 1A and 2A, or may be a rotating drum, as illustrated in FIGS. 1B and 2B.

In the illustrated embodiment, the female die 102 comprises a single cavity 108 defining a rule die adapted to impress onto a substrate a crease line as the relief pattern. In other embodiments, the female die 102 comprises am embossing die, adapted to emboss a substrate to form the relief pattern thereon. However, it will be appreciated that the female die 102 may have any suitable structure, including text and/or a textures pattern.

The female die 102 and/or the portion thereof defining the relief pattern may be formed of metal, a polymeric material, or any other suitable material, and may be created using any suitable mechanism, including ink jet printing, three dimensional printing, etching, or mechanical cutting, for example by a computer numerical control (CNC) machine. In some embodiments, the female die 102 and/or the portion thereof defining the relief pattern may be formed using Surface Adhesive Rule Technology, for example as described in Applicants PCT Application PCT/IL 2011/000389. Disposed opposite female die 102, and spaced therefrom, is a male die film including a flexible male-die contact surface 111 is mounted on a base 112. In some embodiments, such as those illustrated in FIGS. 1A and 1B, the male die film is a resilient, incompressible film 110, for example formed of polyurethane, polybutadiene rubber, or polyisoprene rubber.

In some such embodiments, the male die film 110 has a thickness in the range of 0.5-5 mm.

In other embodiments, such as those illustrated in FIGS. 2A and 2B, the male die film is a compressible male die film 113. As explained in further detail hereinbelow with reference to FIGS. 3A to 3C, the compressible male die film 113 includes at least a base layer 114 adjacent base 112, a contact layer 116, disposed opposite the female-die contact surface 106 of female die 102 and defining the male-die contact surface 111, and a compressible layer 118 disposed between base layer 114 and contact layer 116. In some such embodiments, the male die film 113 has a thickness in the range of 0.5 mm to 10 mm, 1 mm to 9 mm, 1 mm to 8 mm, 1 mm to 5 mm, 1 mm to 3 mm, 1 mm to 2 mm, 2 mm to 8 mm, or 3 mm to 7 mm.

The male die films 110 and 113 are featureless, or a plain flat films, at least in an area opposing the relief pattern of the female die 102. In some embodiments, the male die films 110 and 113, or at least contact surface 111 thereof, are completely featureless, whereas in other embodiments the male die films 110 and 113 may include one or more features, whether features of a male die, a female die, textures, or any other features, in an area which does not oppose the relief pattern of the female die 102.

The base 112 may be a flat, or planar base, as illustrated in FIGS. 1A and 2A, or may be a rotating drum, as illustrated in FIGS. 1B and 2B.

In some embodiments, in which bases 104 and 112 are both rotating drums, as illustrated in FIG. 1B and 2B, rotating drums 104 and 112 may have the same diameter.

A compression mechanism is functionally associated with female die 102 and with male die films 110 or 113, or with bases 104 and 112 thereof, and is adapted to move at least one female die 102 and the male die film 110 or 113 towards one another, as indicated by arrows 120. The compression mechanism may be any suitable compression mechanism, such as a gear based mechanism or a hydraulic mechanism.

In an operative mode, a substrate 130 is placed between female-die contact surface 106 and male-die contact surface 111, and the compression mechanism moves female die 102 and male die film 110 or 113 towards one another, such that the female-die contact surface 106 engages a first surface 132 of the substrate and the male-die contact surface 111 of the male die film 110 or 113 engages an opposing surface 134 of the substrate so as to impress the relief pattern defined by one or more cavities 108 of female-die contact surface 106 on the substrate 130. Specifically, in the operative mode, the substrate 130 is urged by male die film 110 or 113 into one or more cavities 108 of female die 102, thereby to form the relief pattern on the substrate 130.

In the context of the present application and the claims herein, the term "substrate" relates to a workpiece having an impressionable substrate, which, following impression of a broad surface of the substrate by a die and counter-die system, under ambient and/or above-ambient conditions, the impression pattern, after disengagement from the die and counter-die system, is maintained or at least substantially maintained. Such substrates typically include fibrous paper substrates (including, but not limited to, paper, boxboard, cardboard, cardboard with a metalized coating, laminated paper, and laminated cardboard), and metal foils (e.g., aluminum foil, copper foil, and a shape memory metal alloy foil such as nitinol foils), as well as various plastic films, including shape memory plastic films such as polyurethane shape memory plastic films.

In some embodiments, the substrate 130 may be a fibrous substrate such as paper, boxboard, or cardboard, which may be corrugated, and which may have a thickness in the range of 0.1-5 mm.

In some embodiments the substrate may be a paper laminated with a plastic film such as a polypropylene or polyester film, and may have a thickness in the range of 0.1 mm to 5 mm. In some embodiments, the substrate may be a paper covered in a metallic coating, and may have a thickness in the range of 0.1 mm to 5 mm.

In some embodiments, the substrate may be a metal foil, such as aluminum foil or copper foil, which may have a thickness in the range of 0.02 mm to 0.2 mm.

In some embodiments, the substrate may be a shape memory metal alloy foil, such as a Nitinol foil, which may have a thickness in the range of 0.02 mm to 0.2 mm.

In some embodiments, the substrate may be a plastic substrate, such as polyvinylchloride, polypropylene, polycarbonate, or polyester, or a polyurethane shape memory plastic film, which may have a thickness in the range of 0.05 mm to 0.5 mm. In some such embodiments, impression of a relief pattern onto the substrate may be accomplished at an elevated temperature, as known in the art of hot embossing or thermal embossing. In some such embodiments, heat may be applied to the substrate internally by heating base 104, for example via running a hot liquid through the base or via electrical heating of the drum surface, or externally, for example by placing a heat source, such as a halogen lamp, adjacent the male die such that the substrate and/or the relief pattern is heated during the impression process.

Figure 3A:
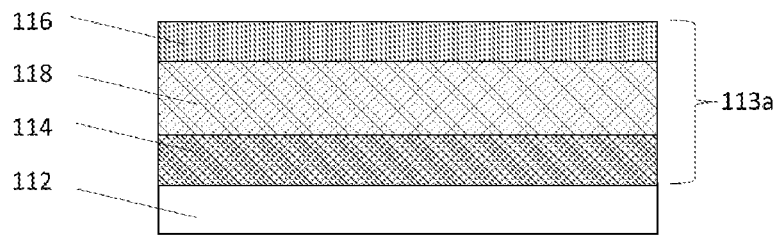
FIGS. 3A, 3B, and 3C are schematic cross-sectional diagram of embodiments of inventive compressible male die films, usable in the systems of FIGS. 2A and 2B, in accordance with aspects of the present invention.
Figure 3B:
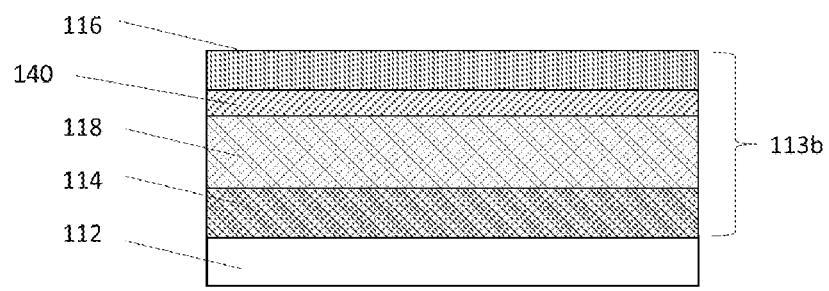
Figure 3C:
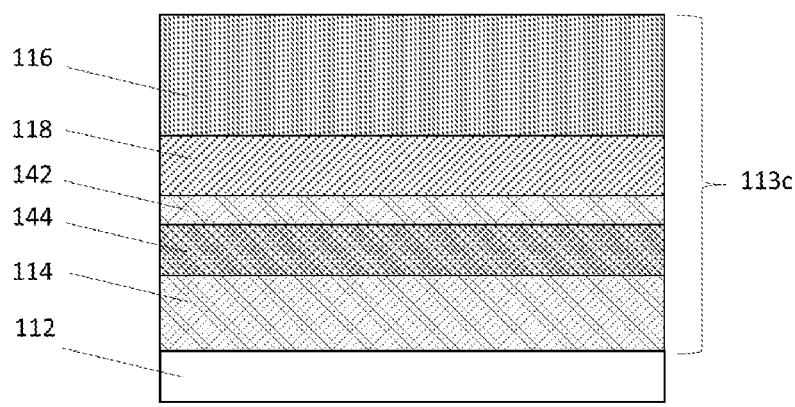

Reference is now made to FIGS. 3A, 3B, and 3C which are schematic cross-sectional diagram of embodiments of inventive compressible male die films 113, mounted on a base 112 and usable in the systems of FIGS. 2A and 2B, in accordance with aspects of the present invention.

FIG. 3A illustrates a basic compressible male die film 113a mounted on a base 112, and including a base layer 114, a compressible layer 118, and a contact layer 116, as described hereinabove with reference to FIGS. 2A and 2B.

In some embodiments, the base layer 114, which may also be thought of as a supporting layer adapted to mechanically support the male die film 113a, may have a thickness in the range of 0.15 mm to 1 mm.

In some embodiments, base layer 114 includes a metal layer, such as an aluminum or steel layer.

In some embodiments, base layer 114 includes a polymer layer, such as a PET layer.

In some embodiments, base layer 114 includes a fabric, or textile layer, particularly a fabric layer, such as a polyester, rayon, or cotton layer. In some embodiments, the fabric layer may include a woven fabric, which in some embodiments has a density in the range of 10-30 threads/cm.

In some embodiments, base layer 114 includes two or more layers of fabric, directly attached to one another, for example by lamination, adhesive, or any other suitable attachment method known in the art.

In some embodiments, the fabric forming base layer 114 includes, or is impregnated with, a rubber based material, such as acrylonitrile butadiene copolymer rubber, chloroprene rubber, or EPDM rubber. The rubber based material may be introduced into the fabric using any suitable method known in the art, for example by coating the rubber material on the fabric with a blade coater or by calendering. In some embodiments, the rubber based material includes a vulcanizing agent such as organic peroxides, as well as sulfur, organic sulfur-containing compound, and the like. In some embodiments, the rubber based material includes a vulcanizing accelerator such as inorganic accelerators (e.g., calcium hydroxide, magnesia (MgO), and the like) and organic accelerators (e.g., thiurams, dithiocarbamates, and thiazoles). In some embodiments the rubber based material includes a softening agent such as fatty acid, cottonseed oil, tall oil, an asphalt substance, paraffin wax, and the like.

The compressible layer 118 is adapted to decrease lateral deformation resulting from pressure applied to male die film 113a. Additionally, the compressible layer is adapted to enable the relief pattern impressed on the substrate to be sharper, for example by enabling increased embossing or creasing depths, sharper angles to embossed features or to crease lines, and the like.

In some embodiments, compressible layer 118 has a thickness in the range of 0.15 mm to 5 mm, 0.15 mm to 4 mm, 0.15 mm to 3 mm, 0.15 mm to 2 mm, or 0.15 mm to 1 mm. In some embodiments, compressibility of the compressible layer 118 is due to foam content therein.

In some embodiments, the compressible layer 118 comprises a rubber foam layer, which may include a synthetic rubber as a rubber matrix thereof In some such embodiments, the synthetic rubber may include one or more of acrylonitrile-butadiene copolymer rubber, butadiene rubber, polyisoprene rubber, butyl rubber, chloroprene rubber, EPDM rubber and polyurethane rubber. The compressible layer may be generated using any suitable method known in the art, such as, for example, the leaching method, as described in the Encyclopedia of Polymer Science and Technology, Concise, By Herman F. Mark, 3rd edition, or the foaming agent method, as described in The Complete Book on Rubber Processing and Compounding Technology (with Machinery Details) 2nd Revised Edition, NIIR Board of Consultants and Engineers, 2016, which are incorporated by reference as if fully set forth herein. In some such embodiments, the supporting base used for the leaching method may be a fabric layer, such as a woven fabric layer. It will be appreciated that the foam content in the compressible layer 118 may depend on the amount of water soluble powder used in the leaching method.

The compressible layer 118 may be directly attached to the base layer 114, for example by lamination or by means of an adhesive, or may be attached to intermediate layers.

In some embodiments, the contact layer 116 has a thickness in the range of 0.1 mm to 5 mm, 0.1 mm to 4 mm, 0.1 mm to 3 mm, 0.1 mm to 2 mm, or 0.1 mm to 1 mm, and a Shore A hardness in the range of 20-90, 30-90, 40-90, 50-90, 60-90, 20-70, 30-70, or 65-75. The contact layer 116 comprises a rubber-based material, which, in some embodiments, includes at least one synthetic rubber. In some such embodiments, the synthetic rubber includes at least one of acrylonitrile-butadiene rubber (NBR), hydrogenated NBR, butadiene rubber, poly-isoprene rubber, butyl rubber chloroprene rubber (CR), EPDM rubber, polyurethane rubber, and acrylic rubber. In some embodiments, in addition to one or more synthetic rubbers, the contact layer 116 further includes a polysulfide rubber.

In some embodiments, the rubber-based material further includes a vulcanizing agent, such as, for example, an organic peroxide (e.g., benzoyl peroxide and the like), sulfur, or an organic sulfur-containing compound (e.g., tetramethylthiuram disulfide, N,N-dithiobismorpholine, and the like). In some embodiments, the amount of added vulcanizing agent is in the range of 0.3 to 4 parts by weight, preferably 0.5 to 3 parts by weight, based on 100 parts by weight of the rubber material.

In some embodiments, the rubber-based material further includes a vulcanization accelerator, such as, for example, an inorganic accelerator (e.g., calcium hydroxide, magnesia (MgO), and the like) or an organic accelerator such as a thiuram (e.g., tetramethylthiuram disulfide, tetraethyl-thiuram disulfide, and the like), a dithiocarbamate (e.g., zinc dibutyldithiocarbamate, zinc diethyldithiocarbamate, and the like), a thiazole (e.g., 2-mercaptobenzothiazole, N-dicyclohexyl-2-benzothiazole sulfenamide, and the like.), and a thiourea (e.g., trimethylthiourea, 30 N,N'-diethylthiourea, and the like).

In some embodiments, the rubber based material may further include an auxiliary vulcanization accelerator, a filler, a reinforcer, a softener, a plasticizer, and/or an antioxidant.

In some embodiments the rubber based material may comprise a compressible rubber based material, such as rubber foam.

Turning to the embodiment illustrated in FIG. 3B, a male die film 113b is adapted to be mounted onto base 112. Compressible counter film 113b includes base layer 114, compressible layer 118, and contact layer 116, all substantially as described hereinabove, and further includes a surface modulating layer 140. The surface modulating layer may have a thickness in the range of 0.15 mm to 1 mm.

The surface modulating layer 140 may be attached along a first broad face thereof to the compressible layer 118 and may be attached along a second broad face thereof to the contact layer 116.

Without wishing to be bound by theory, it is understood by the Inventors that the surface modulation layer 140 as described herein is adapted to inhibit or prevent contact layer 116 from separating from compressible layer 118, or from being rotationally shifted relative thereto, during impression of the relief pattern on the substrate.

Additionally, and without wishing to be bound by theory, it is understood by the inventors that when compressible layer 118 is fully compressed, and additional pressure is applied to contact surface 116, deformation formed in compressible layer 118 are damped by surface modulation layer 140, such that the deformation appearing on the contact surface of contact layer 116 are modulated, for example lower or more spread out, than deformations appearing under the same pressure conditions in compressible male die film 113a of FIG. 3A. As a result, when using compressible male die film 113b, a greater amount of pressure that can be applied to contact layer 116 at the time of impression without damaging the substrate 130 or the relief pattern impressed thereon than when using compressible male die film 113a.

In some embodiments, surface modulating layer 140 includes a fabric layer impregnated with a rubber-based material. In some embodiments, the fabric layer may comprise a cotton, rayon, or polyester layer. In some embodiments, the fabric layer comprises a woven fabric which may have a density in the range of 10-30 threads/cm.

In some embodiments, surface modulating layer 140 includes two or more layers of fabric, directly attached to one another, for example by lamination, adhesive, casting, coextrusion, or any other suitable attachment method known in the art. In some embodiments, the surface modulating layer 140 includes a sponge layer.

In some embodiments, the rubber-based material with which the fabric layer is impregnated includes at least one of acrylonitrile butadiene copolymer rubber, EPDM rubber, and chloroprene rubber. The rubber-based material may be introduced into the fabric using any suitable method known in the art, for example by coating the rubber material on the fabric with a blade coater or by calendering. In some embodiments, the rubber-based material includes a vulcanizing agent such as organic peroxides, as well as sulfur, organic sulfur-containing compound, and the like. In some embodiments, the rubber based material includes a vulcanizing accelerator such as inorganic accelerators (e.g., calcium hydroxide, magnesia (MgO), and the like) and/or organic accelerators (e.g., thiurams, dithiocarbamates, thiazoles, and the like). In some embodiments, the rubber based material includes a softening agent such as fatty acid, cottonseed oil, tall oil, an asphalt substance, paraffin wax, and the like. Referring now to the embodiment illustrated in FIG. 3C, a compressible male die film 113c is adapted to be mounted onto base 112. Compressible male die film 113c includes base layer 114, compressible layer 118, and contact layer 116, all substantially as described hereinabove, and further includes a reinforcing layer 142 and a rubber layer 144. The reinforcing layer 142 may have a thickness in the range of 0.15 mm to 1 mm, and the rubber layer 144 may have a thickness in the range of 0.15 mm to 5 mm, 0.15 mm to 4 mm, 0.15 m to 3 mm, 0.15 mm to 2 mm, or 0.15 mm to 1 mm.

Reinforcing layer 142 may be a fabric layer, such as a cotton, rayon, or polyester layer, which may include a woven fabric. In some embodiments, the woven fabric may be impregnated with rubber, substantially as described hereinabove with reference to base layer 114 and to surface modulating layer 140.

Rubber layer 144 may include any suitable rubber, such as such as EPDM, polyurethane, natural rubber, silicone rubber, or bitumen rubber. The rubber layer may be formed by any suitable method known in the art, such as melting, emulsion impregnation, dual component reactive materials, or hold and hot compressing.

In the illustrated embodiment reinforcing layer 142 is disposed above, and immediately adjacent to, rubber layer 144, and layers 142 and 144 are disposed between compressible layer 118 and base layer 114. However, it will be appreciated that reinforcing layer 142 and rubber layer 144 may be disposed in other locations between base layer 114 and contact layer 116.

In some embodiments, the compressible male die films 113a, 113b, and 113c have a compressibility, in a direction perpendicular to a broad face thereof, in the range of 5-30%, 6-30%, 9-25%, 9-20%, or 9-15% at 1.35 MPa.

In some embodiments, the compressible male die films 113a, 113b, and 113c may have a thickness in the range of 0.5 mm to 10 mm, 0.5 mm to 8 mm, or 1 mm to 7 mm. In some embodiments, the compressible counter films 113a and 113b may have a thickness in the range of 0.5 mm to 4 mm, 1 mm to 3 mm, or 1 mm to 2 mm. In some embodiments, the compressible counter film 113c may have a thickness in the range of 2 mm to 8 mm or 3 mm to 7 mm.

Reference is now made to FIGS. 4A, 4B, 4C, and 4D, which are schematic cross-sectional diagrams of embodiments of female dies suitable for use in the inventive systems of FIGS. 1A to 2B.

Figure 4A:
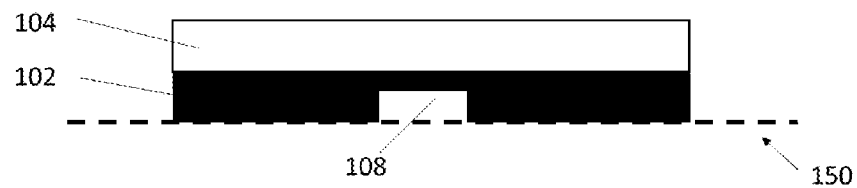
FIGS. 4A, 4B, 4C, 4D, and 4E are schematic cross-sectional diagrams of embodiments of female dies suitable for use in the inventive systems of FIGS. 1A to 2B.

As seen in FIG. 4A, the female die 102, mounted on base 104, includes one or more cavities 108, which cavities are disposed below the nominal surface line of the female die, here indicated by a dashed line 150. The one or more cavities 108 define at least part of the relief pattern. In some embodiments, the female die 102 may be a rule die, and the cavity may be a channel formed in the female die 102 to define a crease line as the relief pattern. In other embodiments, the one or more cavities may define an embossing patter as the relief pattern. It will be appreciated that when using the female die 102 of FIG. 4A, the relief pattern is not surrounded by an artefactual relief pattern resulting from the structure of the die, but rather the substrate surrounding the relief pattern remains unchanged.

In some embodiments, the depth of the cavity 108 with respect to the nominal surface line 150 is less than 5 mm, less than 4 mm, less than 3 mm, less than 2 mm, or less than 1 mm. In the embodiment illustrated in FIG. 4A, the height of the die is considered to be equal to the depth of the deepest cavity 108 in the die.

Figure 4B:
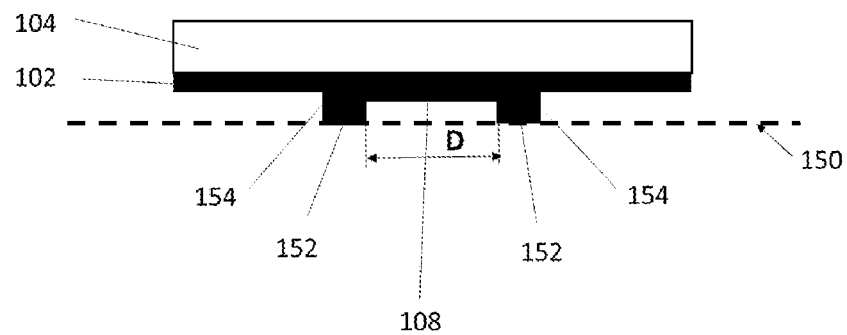

FIG. 4B illustrates a female die 102, wherein the cavity 108 is defined between two rules 152 extending above the nominal surface line of the die to a height H, such that the cavity is disposed at the nominal surface line 150 of the die. The distance between the rules 152, and the width of cavity 108, is identified by D, which, in some embodiments, is smaller than 0.5 mm. In some embodiments, the female die 102 may be a rule die, and the cavity may be a channel formed in the female die 102 to define a crease line as the relief pattern. In other embodiments, the one or more cavities may define an embossing pattern as the relief pattern.

It will be appreciated that walls 154 of rules 152, distal to cavity 108, are substantially perpendicular to the nominal surface line 150 of the die. As such, when impressing the relief pattern onto a substrate, artefactual embossing may be formed surrounding the relief pattern, but the steep drop from height H to the nominal height of the die, as illustrated for example in FIG. 6A.

In some embodiments, the height H of the female die 102 or of rules 152 is less than 5 mm, less than 4 mm, less than 3 mm, less than 2 mm, or less than 1 mm.

Figure 4C:
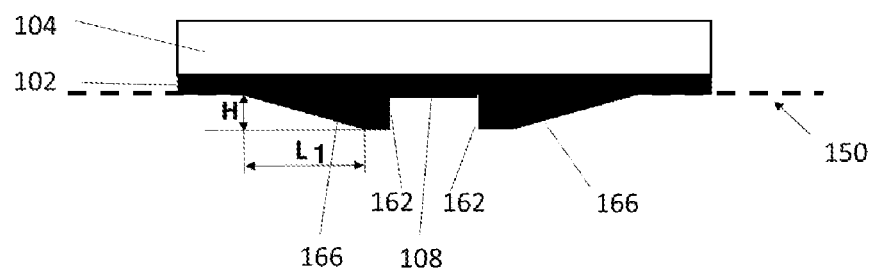
Figure 4D:
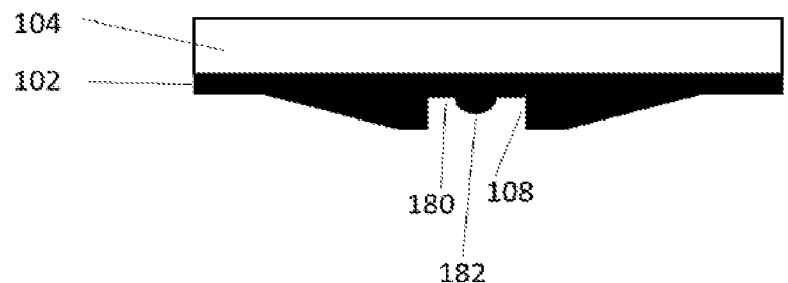
Figure 4E:
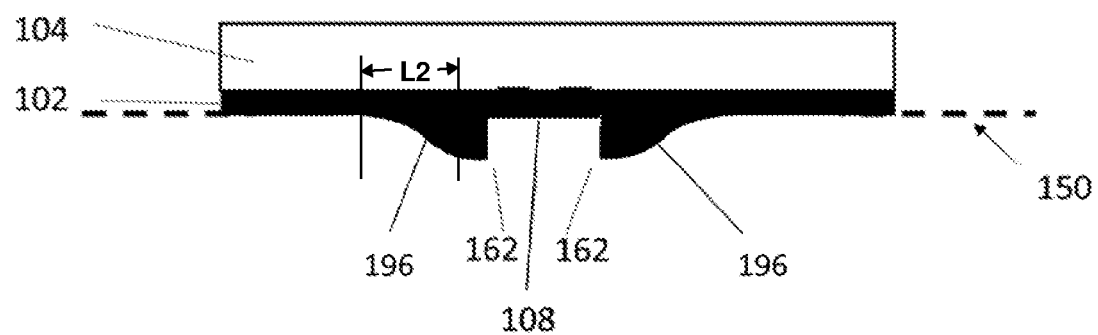

FIGS. 4C and 4E illustrate a female die 102, wherein the cavity 108 is defined between two protrusions 162 extending above the nominal surface line 150 of the die to a height H, such that the cavity is disposed at the nominal surface line of the die. The protrusions have a side 164, adjacent the cavity 108, which is substantially perpendicular to the nominal surface line of the die or is at a desired angle for forming the relief surface. An opposing side 166 (FIG. 4C) or 196 (FIG. 4E) of the protrusions, distal to the cavity 108, defines a gradient from the height H of the protrusions to the nominal surface line 150 of the die. The length of the gradient is defined to be from the edge of cavity 108 to the point where the gradient reaches the nominal surface line of the die, and is identified as L1 in FIG. 4C and as L2 in FIG. 4E.

As explained in further detail hereinbelow with reference to FIGS. 5A to 6C, in order to avoid artefactual embossing or creasing of the substrate, the gradient of side 166 and/or side 196 must be sufficiently mild so as not to visibly impact the paper. As such, in some embodiments, the length to height ratio of the gradient is at least 10, at least 15, or at least 20.

The profile of the gradient may be any suitable gradient, such as a linear gradient terminating at a point at a highest point above the nominal surface line, a truncated linear gradient, as shown on the sides 166 of cavity 108 in FIG. 4C, or a gradient having a complex geometric form , such as a gradient defined by a function including a Gaussian element, a sinusoid element, or a parabolic element, as shown on the sides 196 of cavity 108 in FIG. 4E. Due to the acute angle formed at the highest point of a linear gradient, such a gradient may still result in visible impact to the substrate outside of, or surrounding, the embossing or creasing region, and thus may be unsuitable in certain embodiments. A gradient having a complex geometric form, as illustrated in FIG. 4E, may be advantageous in embodiments in which multiple patterns are impressed onto the substrate fairly close to one another. This is due to the fact that a gradient having a complex form may provide the same effect as a truncated linear gradient, while affecting a smaller radius surrounding the impressed pattern, due to the fact that the length of a gradient having a complex form, such as L2 in FIG. 4E, is smaller than the length of a linear gradient or truncated linear gradient, such as L1 in FIG. 4C.

In some embodiments, the height H of the female die 102 or of protrusions 162 is less than 5 mm, less than 4 mm, less than 3 mm, less than 2 mm, or less than 1 mm.

Turning to FIG. 4D, it is seen that in some embodiments, at least part of the relief pattern is defined on bottom surface 180 of the cavity 108 of die 102. In the exemplary illustrated embodiment, part of the relief pattern is defined by protrusions 182 along bottom surface 180 of the cavity, such that the resulting embossed pattern has recesses therein. It will be appreciated that in some embodiments in which the relief pattern is defined along bottom surface 180 of the cavity 108 of female die 102, in use the substrate must be urged into cavity 108 to the entire depth thereof, so as to engage the relief pattern on the bottom surface of the cavity.

Figure 5A:
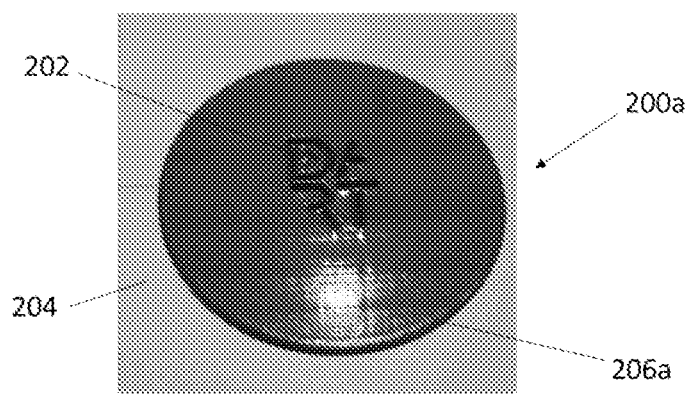
FIGS. 5A, 5B, and 5C are photographs of female dies usable in the systems of FIGS. 1A to 2B, having different gradient height to length ratios.
Figure 5B:
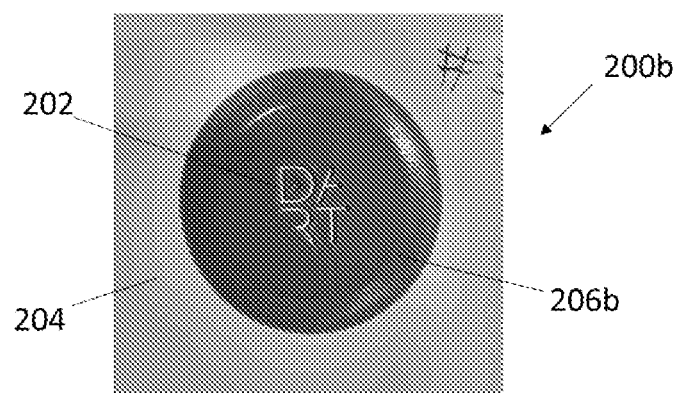
Figure 5C:
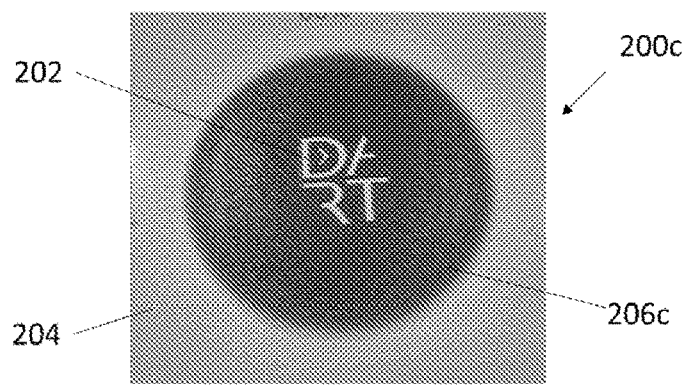
Figure 6A:
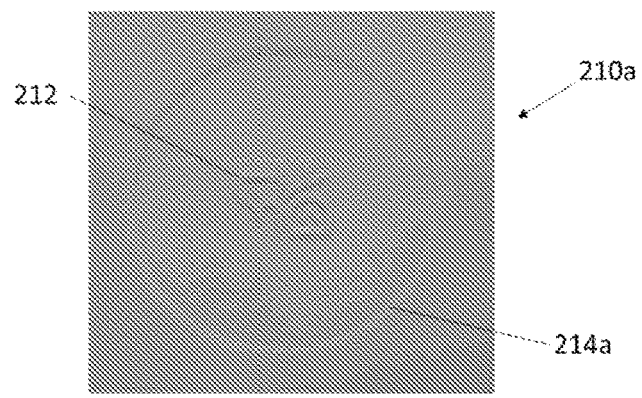
FIGS. 6A, 6B, and 6C are photographs of substrates embossed using the systems of FIGS. 2A to 2B and the respective dies of FIGS. 5A, 5B, and 5C.
Figure 6B:
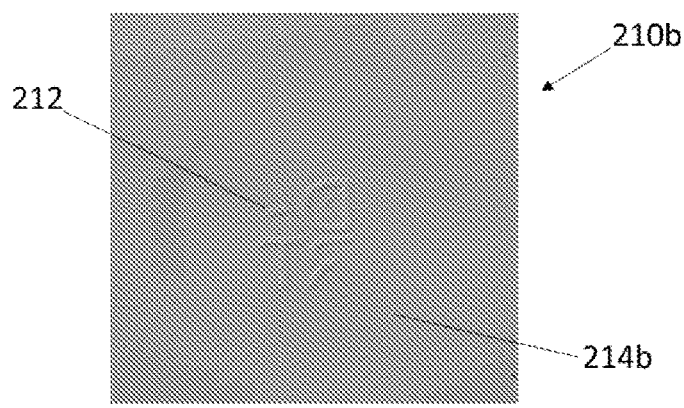
Figure 6C:
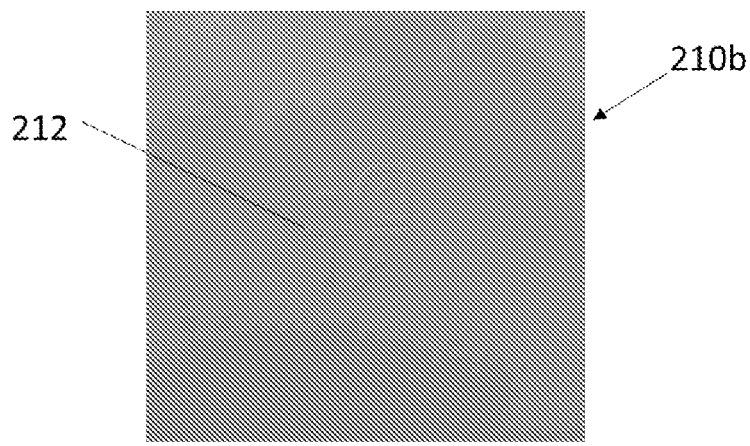

Reference is now made to FIGS. 5A, 5B, and 5C are photographs of female dies usable in the systems of FIGS. 1A to 2B, having different gradient length to height ratios, and to FIGS. 6A, 6B, and 6C, which are photographs of substrates embossed using the systems of FIGS. 2A to 2B and the respective dies of FIGS. 5A, 5B, and 5C.

FIGS. 5A to 5C illustrate respective circular female dies 200a, 200b, and 200c including defining cavities 202 decoratively forming the shape of the letters DART, and mounted on a base surface 204.

For preparation of dies 200a, 200b, and 200c, a two dimensional image of the die pattern which will become cavities 202 was prepared using Adobe Illustrator software.

The two dimensional image was printed onto an SH92 250 micron PET film, commercially available from SKC Inc. of Ga., USA, using a DMPS 4275 flatbed UV printer commercially available from DMPS CO., LTD. of South Korea. Inkjet ink commercially available from DMPS Co. LTD of South Korea was used for layer on layer printing in "White Mode" using all CMYKWWWW colors, at a printing resolution of 2880×1440 dpi. Triple layer printing resulted in a die having a height H of 280 microns in areas with no pattern.

FIGS. 6A to 6C illustrate respective paper substrates 210a, 210b, and 210c, embossed using the system of FIG. 2A or 2B, using female dies 200a, 200b, and 200c, respectively. For embossing, 300 gsm Invercote Creato paper, commercially available from Iggesund of Sweden was embossed using a CDP500 Roll Die Cutting Machine commercially available from Beijing Hengyin Machinery Manufacturing CO., LTD of Beijing, China mounted with respective dies 200a, 200b, and 200c, and with a resilient male die film as described hereinabove with respect to FIGS. 1A and 1B.

As seen, each of substrates 210a, 210b, and 210c has embossed thereon a relief pattern 212 including the letters DART in a pattern corresponding to the cavities 202 of female dies 200. The letters in embossed pattern 212 are in mirror-image to those shown on the dies 200, as the dies were placed over the paper during the embossing process.

Turning specifically to FIGS. 5A and 6A, it is seen that in die 200a of FIG. 5A, the side walls 206a distal to the cavities 202 is substantially perpendicular to the base surface 204. As a result, when the die 200a is pressed against the compressible male die film 113 (FIGS. 2A and 2B), an artefactual pattern corresponding to border of the die, shown as circle 214*a* in FIG. 6A, is clearly formed on the substrate. The circle 214*a* corresponds in dimensions to the size of die 200*a*.

In FIG. 5B, side walls 206*b* distal to cavities 202 of die 200*b* have a steep linear gradient as described hereinabove with reference to FIG. 4C. The gradient has a length-to-height ratio of 6. As a result, when the die 200*b* is pressed against the compressible male die film 113 (FIGS. 2A and 2B), an artefactual pattern corresponding to border of the die, shown as circle 214*b* in FIG. 6B, is indistinctly visible on the substrate. The circle 214*b* corresponds in dimensions to the size of die 200*b*.

In FIG. 5C, side walls 206*c* distal to cavities 202 of die 200*c* have a mild linear gradient as described hereinabove with reference to FIG. 4C. The gradient has a length-to-height ratio of 32. As a result, when the die 200*c* is pressed against the compressible male die film 110 (FIGS. 2A and 2B), no artefactual pattern is visible on the substrate, as seen in FIG. 6C.

As can be seen from comparison of FIGS. 5A, 5B, and 5C, the greater the length-to-height ratio of the gradient of the side walls 206 of the die, the greater the overall size, or footprint, of the die. However, as seen from comparison of FIGS. 6A, 6B, and 6C, the change to the gradient of the side wall of the die does not impact the dimensions, clarity, or embossing depth of the relief pattern embossed onto the substrate.

Figure 7:
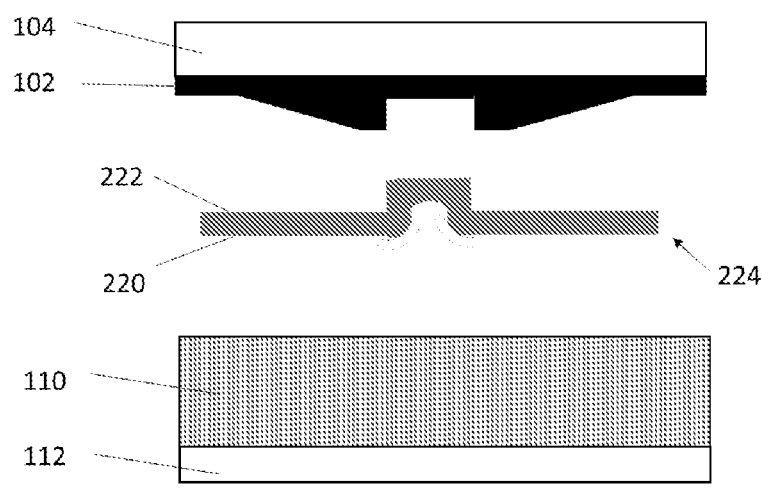
FIG. 7 is a schematic cross sectional diagram of characteristics of a substrate embossed using the systems of FIGS. 1A to 2B.

Reference is now made to FIG. 7, which is a schematic cross sectional diagram of characteristics of a substrate embossed using the systems of FIGS. 1A to 2B.

As seen in FIG. 7, a substrate 220 embossed using the systems of FIGS. 1A to 2B includes a first broad surface 222 engaging the female die 102, and a second, opposing broad surface 224 engaging the male die film 110 or 113. As illustrated in FIG. 7, it is a particular feature of the present invention that the relief pattern impressed onto the substrate 220 is sharper on the surface 222, which engages female die 102, than on the opposing surface 224, which engages the male die film 110 or 113.

In the context of the present application and the claim thereof, the terms "sharpness of relief pattern", "sharper relief pattern", and the like refer to the clarity of the relief pattern impressed on the substrate, and include parameters such as the depth of the relief pattern, the curvature of angles of the relief pattern, the size of the angles of the relief pattern. For example, a relief pattern may be considered to be clearer, or sharper, if angles in the relief pattern have proper corners, and not curved corners. As another example, a relief pattern may be considered to be clearer, or sharper, if the depth of the relief pattern (or the height of an embossed relief pattern) is greater. As yet a further example, a relief pattern may be considered to be clearer, or sharper, if the angles of the relief pattern are sharper angles (geometrically). As a further example, a relief pattern may be considered to be clearer, or sharper, the more easily one can identify a folding line in the relief pattern.

In some embodiments, the system of FIGS. 1A to 2B can be used for producing a featured male-die contact surface. In such embodiments, the contact layer of the male die film comprises a thin featureless sheet of flexible non-resilient material, such as, for example, an aluminum or steel sheet. The compression mechanism is employed to move the male die film and the female die toward one another, so that pressure is applied to the contact layer of the male die film, and the contact layer of the male die film, as well as the substrate (if it is included in the process) is urged into the cavity of the female die. As a result, the shape of the cavity of the female die becomes impressed on the male-die contact surface forming thereon a feature corresponding in shape to that of the cavity of the female die.

In the context of the present application and of the claims herein, the term "attached" relates to direct attachment between two objects, attachment between two objects via an adhesive layer, or attachment between two objects via one or more intermediate objects or layers.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for impressing a relief pattern on a substrate, the system comprising:
    at least one female die including a female-die contact surface, said female-die contact surface including at least one cavity defining the relief pattern, wherein at least part of the relief pattern is defined on a bottom surface of said cavity; and
    a compressible male die film including a flexible male-die contact surface spaced from said female-die contact surface, said male-die contact surface being featureless in a region thereof opposing the relief pattern on said at least one female die; and
    a compression mechanism adapted to move said male die film and said at least one female die towards one another in an operative mode,
    wherein, in said operative mode, when the substrate is disposed between said male-die contact surface and said female-die contact surface, said compression mechanism moves said male die film and said at least one female die towards one another such that said female-die contact surface engages a first broad surface of the substrate and said male-die contact surface engages an opposing broad surface of the substrate so that said substrate is urged into said cavity to engage said relief pattern on said bottom surface so as to impress the relief pattern on the substrate.

2. The system of claim 1, wherein said compressible male die film includes:
    a base layer;
    a contact layer including said male-die contact surface adapted to contact the substrate; and
    a compressible layer disposed between said base layer and said contact layer and attached thereto.

3. The system of claim 2, said compressible male die film having compressibility, in a direction perpendicular to a broad face of said compressible male die film, in the range of 5-30 % at 1.35 MPa.

4. The system of claim 2, wherein said base layer includes at least one layer selected from the group consisting of a metal layer, a polymer layer, and a fabric layer.

5. The system of claim 4, wherein said base layer comprises a fabric layer including at least two layers of fabric attached to one another.

6. The system of claim 4, wherein said base layer comprises a fabric layer impregnated with a rubber-based material.

7. The system of claim 2, wherein said compressible layer is adapted to decrease lateral deformation resulting from pressure applied to said male die film in a direction perpendicular to said broad face thereof.

8. The system of claim 2, wherein said compressible layer comprises a rubber foam layer.

9. The system of claim 2, wherein said compressible layer is directly attached to said base layer.

10. The system of claim 2, said contact layer comprising a compressible rubber-based material.

11. The system of claim 2, wherein said compressible male die film further includes a surface modulating layer disposed between said base layer and said contact layer and adapted such that, in said operative mode when pressure applied to said contact layer exceeds an amount of pressure required to fully compress said compressible layer, said surface modulating layer responds by modulating at least one of a height and a surface area of a deformation formed on said contact layer.

12. The system of claim 11, wherein said surface modulating layer is attached along a first broad face thereof to said compressible layer and along a second broad face thereof to said contact layer.

13. The system of claim 11, wherein said surface modulating layer is adapted to inhibit said contact layer from separating from said compressible layer or from being rotationally shifted relative thereto during impression of the relief pattern on the substrate.

14. The system of claim 11, wherein said surface modulating layer includes at least one fabric layer impregnated with a rubber-based material.

15. The system of claim 1, wherein the relief pattern is defined by at least one wall surrounding a surface at or above a nominal surface line of said female die, the wall having a wall height, and
wherein a side of said at least one wall, distal to the relief pattern, defines a gradient from said wall height to said nominal surface line of said female die.

16. The system of claim 15, wherein said gradient has a length to height ratio of at least 10.

17. A method of producing a featured male-die contact surface, the method comprising:
providing a system of claim 1, wherein said contact layer of said male die film comprises a thin featureless sheet of a non-resilient material;
employing said compression mechanism to move said male die film and said female die toward one another thereby to apply pressure to said contact layer of said male die film and to push said contact layer of said male die film towards said at least one female die,
wherein said pressure applied to said contact layer of said male die film causes said contact layer to be urged into said at least one cavity, thereby to form a male die including at least one feature on said contact layer, such that at least part of said at least one feature is sustained after disengagement between said male die film and said at least one cavity.

18. A method according to claim 17, wherein at least one male die corresponding in shape to at least one female die is formed, the method further comprising:
placing a substrate between the at least one female die and the formed at least one male die; and
moving said at least one male die toward said at least one female die such that said at least one male die engages a first broad surface of said substrate and said at least one female die engages an opposing broad surface of said substrate so that said substrate is urged into said cavity to engage said relief pattern on said bottom surface so as to impress said relief pattern corresponding to said shape of said at least one female die on said substrate.

19. A method for impressing a relief pattern on a substrate, the method comprising:
placing a substrate between at least one female die and a male die film,
wherein the at least one female die includes a female-die contact surface including at least one cavity defining the relief pattern, wherein at least part of the relief pattern is defined on a bottom surface of said cavity,
and wherein the male die film includes a flexible male-die contact surface spaced from said female-die contact surface, said male-die contact surface being featureless in a region thereof opposing the relief pattern on said at least one female die; and
moving said at least one female die and said male die film towards one another such that said female-die contact surface engages a first broad surface of the substrate and said male-die contact surface of said male die film engages an opposing broad surface of the substrate so that said substrate is urged into said cavity to engage said relief pattern on said bottom surface so as to impress the relief pattern on the substrate.

20. The method of claim 19, wherein the substrate is a fibrous substrate.

* * * * *